US008805901B1

(12) United States Patent
Jacobs et al.

(10) Patent No.: US 8,805,901 B1
(45) Date of Patent: Aug. 12, 2014

(54) GEOGRAPHICALLY DISTRIBUTED FILE SYSTEM

(75) Inventors: Aaron Jacobs, Rozelle (AU); Benjamin C. Appleton, Summer Hill (AU)

(73) Assignee: Google Inc., Mountain View, CA (US)

( * ) Notice: Subject to any disclaimer, the term of this patent is extended or adjusted under 35 U.S.C. 154(b) by 141 days.

(21) Appl. No.: 13/454,664

(22) Filed: Apr. 24, 2012

Related U.S. Application Data

(60) Provisional application No. 61/509,537, filed on Jul. 19, 2011.

(51) Int. Cl.
G06F 17/30 (2006.01)

(52) U.S. Cl.
USPC ............................ 707/822; 707/625; 707/695

(58) Field of Classification Search
USPC ......... 707/625, 638, 695, 698, 770, 774, 812, 707/822, 826, 828, 813, 818, 821, 827, 952
See application file for complete search history.

(56) References Cited

U.S. PATENT DOCUMENTS

| | | | | |
|---|---|---|---|---|
| 5,790,848 A * | 8/1998 | Wlaschin | ....................... | 707/661 |
| 7,809,685 B2 * | 10/2010 | Wolff | ............................ | 707/648 |
| 2010/0180128 A1 * | 7/2010 | Borden et al. | ................ | 713/189 |

OTHER PUBLICATIONS

Xiao et al., VAOFS: A Verifiable Append-Only File System for Regulatory Compliance, Grid and Cooperative Computing, 2009. GCC '09. Eight International Conference on, Digital Object Identifier: 10.1109/GCC.2009.52, Publication Year: 2009, pp. 325-330.*
Wikipedia, Paxos algorithm, retrieved from Internet Jan. 26, 2011, http://en.wikipedia.org/wiki/Paxos_algorithm, 19 pages.
Wikipedia, Vent, retrieved from Internet Jan. 26, 2011, http://en.wikipedia.org/wiki/Venti, 4 pages.
Google Inc., Google App Engine, retrieved from internet Apr. 24, 2012, https://developers.google.com/appengine/docs/python/datastore, 2 pages.

* cited by examiner

*Primary Examiner* — Greta Robinson
(74) *Attorney, Agent, or Firm* — Fish & Richardson P.C.

(57) ABSTRACT

Implementations of the present disclosure are directed to a method, system, and storage media for receiving an indication that an attempt to make a modified first version of a directory a current version of the directory in a file system using a consensus protocol did not succeed and, in response thereto, obtaining a most recent second version of the directory including second pointers and a second name associated with each of the second pointers, wherein each second pointer is a reference to an immutable data object in the file system; and identifying one or more of the second names, each identified second name being the same as one of the first names but being associated with a second pointer that is different than the first name's respective first pointer, and obtaining for each identified second name, the data object referenced by the respective second pointer from the file system.

24 Claims, 13 Drawing Sheets

GEOGRAPHICALLY DISTRIBUTED FILE SYSTEM

CLAIM OF PRIORITY

This application claims priority under 35 USC §119(e) to U.S. Patent Application Ser. No. 61/509,537, filed on Jul. 19, 2011, the entire contents of which are hereby incorporated by reference.

BACKGROUND

This specification relates to file systems and, in particular, to geographically distributed file systems.

A distributed file system can include multiple computing storage devices distributed across many geographic regions. A user can access the distributed file system through an end-user computing device. The access can include reading and writing to directories and files stored on the distributed file system. However, multiple users can access the same directories and files at a similar time. Thus, when the multiple users attempt to write to the same directory at substantially the same time, inconsistent states of the directories and files can arise.

SUMMARY

In general, one aspect of the subject matter described in this specification can be embodied in methods implemented by data processing apparatus that include the actions of receiving a first version of a directory including a plurality of distinct first pointers and a first name associated with each of the first pointers, wherein each pointer is a reference to an immutable data object in an append-only file system, the receiving including obtaining from the append-only file system each first pointer's respective data object; replacing one of the first pointers in the first version of the directory with a different new pointer that is a reference to a different data object than that referenced to by the first pointer to provide a modified first version of the directory; receiving an indication that an attempt to make the modified first version of the directory a current version of the directory in the append-only file system using a consensus protocol did not succeed and, in response thereto: obtaining a most recent second version of the directory comprising a plurality of second pointers and a second name associated with each of the second pointers, wherein each second pointer is a reference to an immutable data object in the append-only file system; and identifying one or more of the second names, each identified second name being the same as one of the first names but being associated with a second pointer that is different than the first name's respective first pointer, and obtaining for each identified second name, the data object referenced by the respective second pointer from the append-only file system, wherein the identified second names are fewer in number than the first names. Other embodiments of this aspect include corresponding systems, apparatus, computer programs, and storage media.

These and other aspects can optionally include one or more of the following features. One of the second pointers in the second version of the directory can be replaced with another different new pointer that is a reference to a different data object than that referenced to by the second pointer to provide a modified second version of the directory; and receiving an indication that an attempt to make the modified second version of the directory the current version of the directory in the append-only file system using the consensus protocol succeeded. The immutable data object can be a file or a directory. The consensus protocol can use the Paxos algorithm. The first or the second pointer can represent a hash digest of the data object referred to by the first or the second pointer. The hash digest can be generated using a SHA-1 hash function. The append-only file system does not allow data objects stored in the append-only file system to be modified. The append-only file system can be distributed across different storage nodes.

Particular implementations of the subject matter described in this specification can be implemented so as to realize one or more of the following advantages. The system facilities retrieving a directory including data objects by an end-user computing device from a distributed file system by storing a portion of previously retrieved data objects that are stored in its cache.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
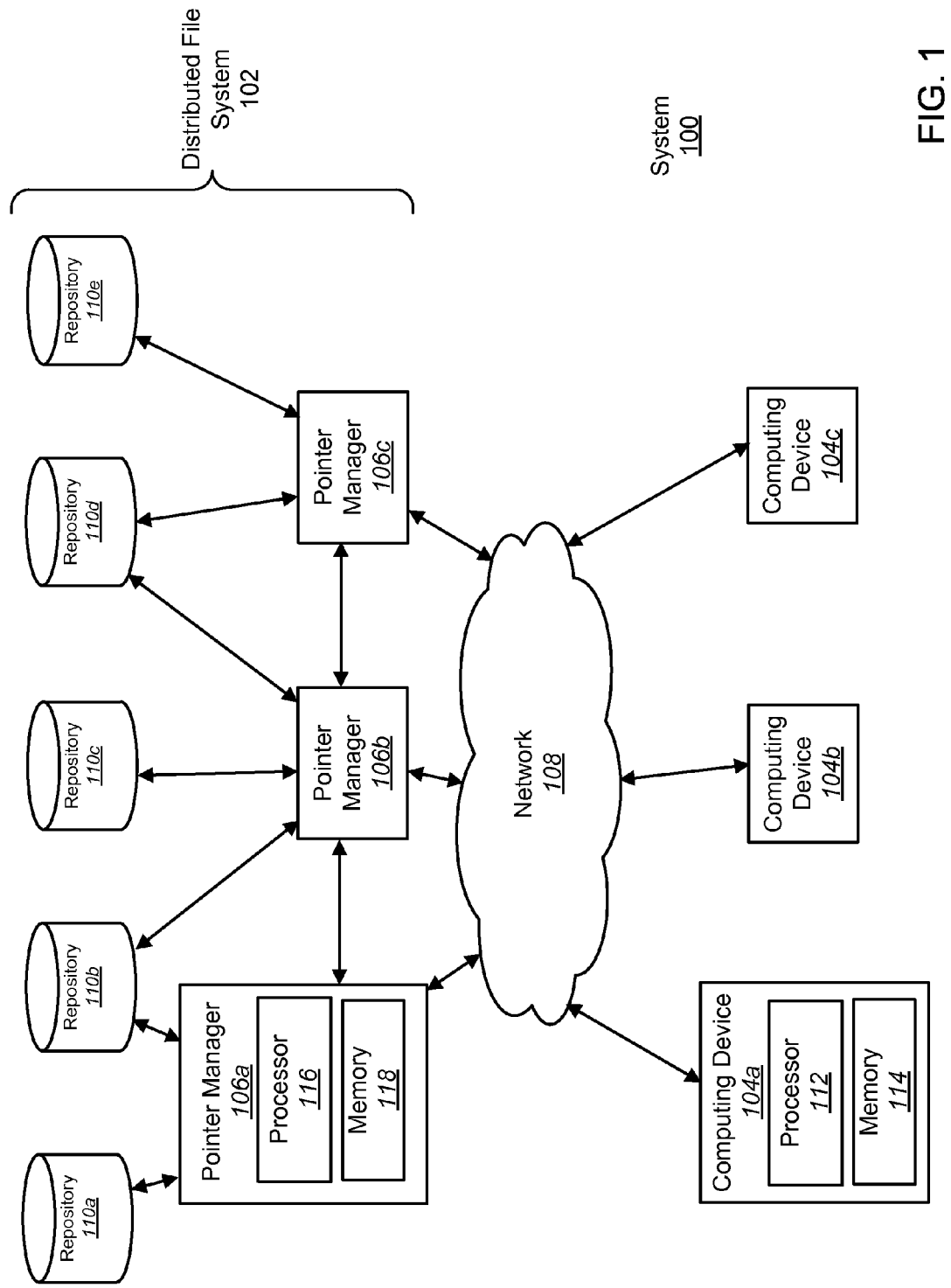
FIG. 1 illustrates an example of a distributed computing system.

A distributed file system allows access to electronic directories (or "directories") from different computing devices such as servers, personal computers, laptop computers, tablet computers, and smart phones, for example. The directories can be stored on one or more storage devices (e.g., hard disks, optical media, flash memory, and so on) that are accessible over a computer network. For example, a server can service requests from client computing devices (or "clients") to read from or write to the directories in the distributed file system. The one or more storage devices of the distributed file system can be geographically distributed. In one embodiment, the distributed file system stores information in an append-only file system. An append-only file system stores data such that data, once stored, cannot be modified from the distributed file system. In some implementations, the data cannot be removed from the distributed file system once the append-only file system stores the data.

As used herein, a data object is used to refer to a directory or an electronic file (or "file"). A file represents one or more blocks of information. A directory is a virtual container that is used to maintain a collection of one or more pointers and names associated with the pointers ("pointer-name pairs"). The pointer can be a hash digest of the contents of a data object that it references, for example. The hash digest is a unique and compact numerical representation of a piece of data (e.g. the contents of the data object). In some implementations, there is a one-to-one correspondence between pointers and the data objects to which they refer. For example, the hash digest can be a SHA-1 hash digest. The name is human-readable text that identifies a respective data object. For example, a directory can contain a pointer and a name "README.txt" where the pointer refers to a data object in an append-only file system and the name is a file name for the data object. In another example, the directory can contain a subdirectory. The subdirectory can also maintain a collection of pointers and names associated with the pointers. Further, a subdirectory can also contain further subdirectories (e.g., nested directories). There can be any number of such nested directories. When a data object is stored in the append-only file system, the information content of the data object cannot be modified. Thus, to update the information content of the data object, a modified version of the data object can be created and stored in the append-only file system. A new pointer to the modified version of the data object replaces the pointer to the old version of the data object in the directory.

Clients can access the directories of the distributed file system. For example, the clients can download or read the directories from, and upload or write directories to, the distributed file system. When a client reads a directory, the client stores the directory in a local cache. That is, the client stores the directory's pointers, names, and copies of the data objects referred to by the pointers in the client's memory. The client can alter the contents of the cached data objects. For example, the client can make edits to a cached data object that represents a word processing file. In some implementations, the client only alters a portion of the data objects referred to by the pointers of the directory. Thus, the client only needs to store the pointers, names, and the copies of the data objects relating to the portion of the data objects that have content to be altered. Therefore, the entire contents of the directory and each data object referred to by pointers of the directory do not have to be downloaded.

To save a modified data object, the client creates a new version of the data object in the append-only file system. The new version of the data object will have a new pointer but will still be associated with the same name as the original data object. The new pointer replaces the original pointer to the data object in the cached copy of the directory.

To create a new version of a data object, the client attempts to upload the modified version of the data object to the distributed file system. Pointer managers of the distributed file system determine whether this modified version of the data object should become the most current (e.g. the newest) version of the data object stored in the distributed file system. For example, another client can attempt to upload another modified version of the data object at approximately the same time. The pointer managers determine which client's modified version of the data object should be made the most current version of the data object by employing a consensus protocol. A consensus protocol determines one result or outcome for an action attempted by a group of participants, such as by the pointer managers of the distributed file system. In some implementations, the consensus protocol is, or is based on, the Paxos protocol. Other consensus protocols are possible. If the pointer managers determine that the modified version of the data object from a given client will become the most current version of the data object, then the pointer managers make the modified version of the data object the most current version of the data object in the distributed file system. If the modified version of the data object is not the most current version of the data object (as determined by the consensus protocol), then the pointer managers inform the client of such.

When the client is successful in making the modified version of the data object the most current version of the data object stored in the distributed file system, the distributed file system creates a new pointer and a modified version of the directory. The new pointer references the modified version of the data object. The modified version of the directory has the previous pointer replaced with the new pointer for the modified version of the data object. In some implementations, the distributed file system returns the new pointer and the modified version of the directory to the client. The client stores the modified version of the directory in its local cache. The name has not changed in response to creating the modified version of the data object, associating the new pointer with the name, or creating the modified version of the directory.

When the client is successful in making its modified version of the data object the most current version of the data object stored in the distributed file system, the client does not have to download all of the contents of the directory and/or data objects referenced by the pointers of the directory when the client accesses the directory and data objects referenced by the pointers of the directory again at a later time. Specifically, the client does not have to download the above-mentioned modified version of the data object (i.e., the most current version of the data object) from the distributed file system since this data object is stored in its local cache.

FIG. 1 illustrates an example distributed computing system 100. System 100 includes a distributed file system 102, client computing devices 104 ("clients") (illustrated individually as client computing devices 104a-104c), and a network 108.

The clients 104 access data objects (e.g., directories and files) stored in the distributed file system 102. The clients 104 can access the data objects by downloading the data objects from the distributed file system 102 to a memory 114 (or cache) of the client 104. The clients 104 can likewise upload (e.g., save) data objects to the distributed file system 102. Each client 104 includes one or more processors 112 such as microprocessors, for instance.

The distributed file system 102 includes repositories 110 (illustrated individually as repositories 110a-110e). The repositories 110 store the data objects in an append-only file system. A repository can store data objects in persistent storage such as hard drives or Flash memory, for example. In some implementations, the repositories 110 store multiple copies of the data objects for redundancy safeguards. In further implementations, the repositories 110 are geographically dispersed.

The distributed file system 102 further includes pointer managers 106 (illustrated individually as pointer managers 106a-106c). The pointer managers 106 can communicate with the clients 104 (via the network 108) and the repositories 110. When a particular client 104 attempts to upload (or save) a data object to the distributed file system 102, the pointer managers 106 determine whether the particular client 104 is to be successful in uploading the data object. Specifically, the pointer managers 106 can communicate with one another, and using a consensus protocol can determine whether the particular client 102 is to be successful when attempting to upload (or save) the data object to the distributed file system 102, detailed further below.

Each pointer manager 106 can communicate with any subset of the repositories 110, including each repository 110. As shown in FIG. 1, the pointer manager 106a can communicate with the repositories 110a and 110b; the pointer manager 106b can communicate with the repositories 110b, 110c, and 110d; and the pointer manager 106c can communicate with the repositories 110d and 110e. The pointer managers 106 each include one or more processors 116 and a memory 118.

The clients 104 communicate with the pointer managers 106 through the network 108. The network 108 can include one or more wired (e.g., Ethernet) or wireless (e.g., Wi-Fi) networks, for example. In some implementations, the internal network 116 is an intranet.

Multiple clients 104 can write to the same directories stored on the distributed file system 102 at substantially the same time. However, this can lead to inconsistent states of the data objects (e.g., directories and files) stored on the distributed file system 102, described in detail below.

Figure 2A:
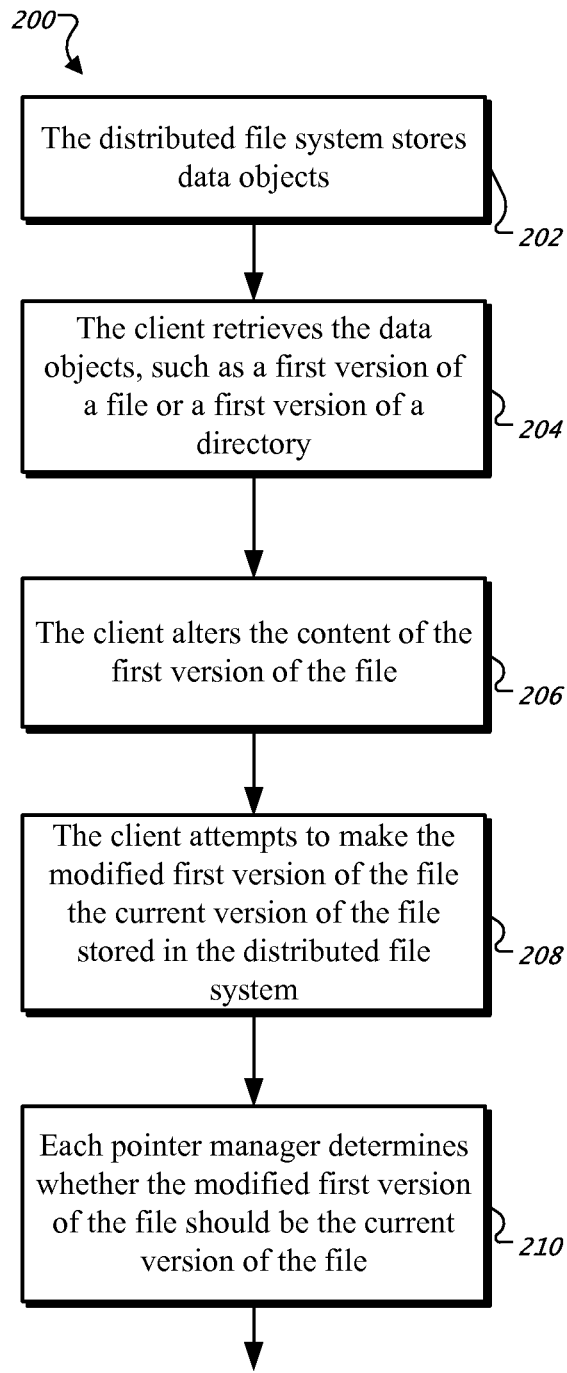
FIGS. 2A-B show a flow diagram of an example technique employed by the system for determining a most current version of a data object (e.g., a file or a directory) for uploading to a distributed file system by one of the clients.
Figure 2B:
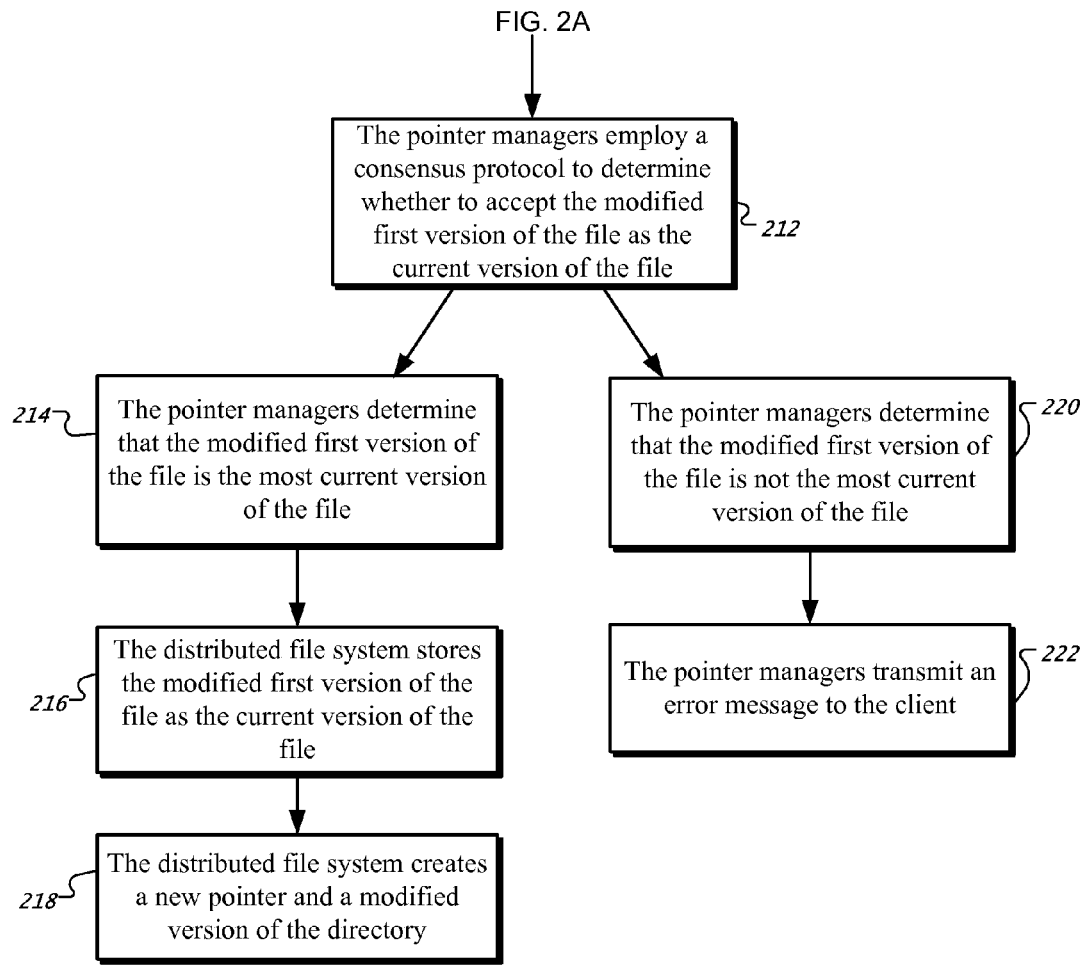
Figure 3:
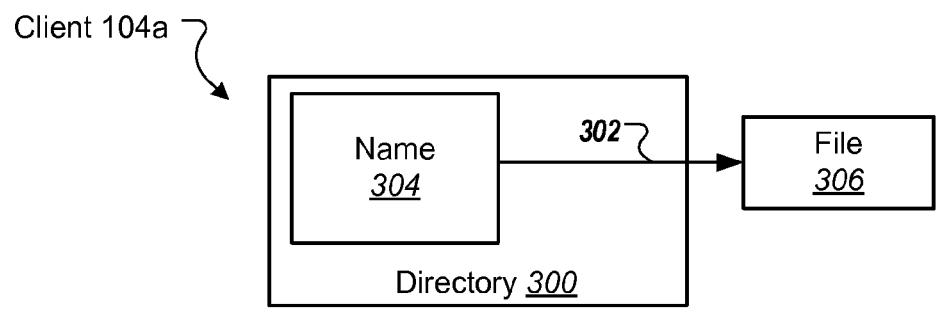
FIG. 3 is a schematic diagram of an example directory at a client, the directory including a pointer and a name associated with the pointer.

FIGS. 2A-B is a flow diagram of an example technique 200 employed by the system 100 for determining a most current version of a data object (e.g., a file or a directory) for uploading to the distributed file system 102 by one of the clients 104. The distributed file system 102 stores data objects (e.g., directories and files), such as a first version of a directory and a first version of a file (202). The distributed file system 102 can store the data objects in one or more of the repositories 110. By way of illustration, client 104a can retrieve (e.g., download) one or more data objects, such as a first version of a directory 300 and a first version of a file 306 (204). As shown in FIG. 3, the directory 300 includes a pointer 302 and a name 304 associated with the pointer 302 ("a pointer-name pair"). The directory 300 can include any number of pointer-name pairs. The pointer 302 refers the name 304 of the file 306 stored in the cache 114 of the client 104a. In some implementations, the pointer 302 is a hash digest of the contents of the file 306. In some implementations, the pointer is a SHA-1 hash digest of the contents of the file 306. Thus, the pointer 302 uniquely identifies the file 306. The name 304 is a human-readable file name and the file 306 is an immutable data object. The client 104 stores the first version of the directory 300 and the first version of the file 306 in the cache 114 of the client 104a.

Figure 4:
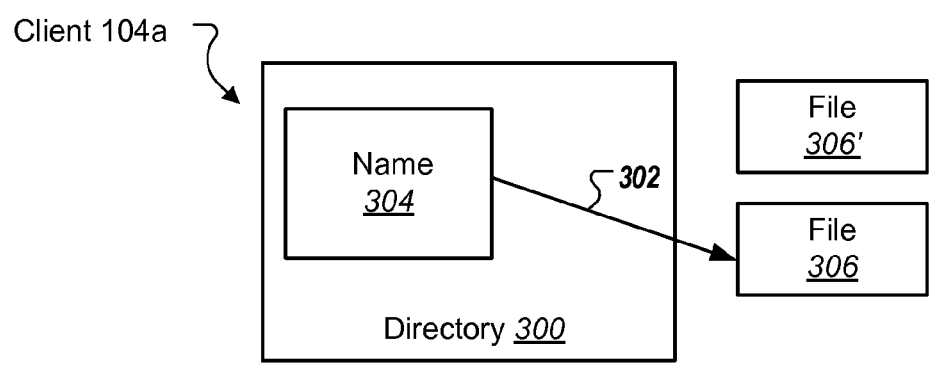
FIG. 4 is a schematic diagram of the example directory at the client, the client altering the contents of a first version of a file creating a modified first version of the file.

The client 104a alters the content of the first version of the file 306 creating a modified first version of the file 306' (206), as shown in FIG. 4. For example, the file 306 can be a word processing document that gets edited on the client 104a, thereby creating an updated word processing document, that is, file 306'.

The client 104a can then attempt to make the modified first version of the file 306' the current version of the file in the distributed file system 102 (208). When it does, the pointer managers 106 determine whether the modified first version of the file 306' should be the current version of the file stored in the distributed file system 102 (210). To do this, each pointer manager 106 first determines whether the file stored in the distributed file system 102 has (or has not) been updated since the client 104a retrieved the unmodified version of file 306 at step 202. After each pointer manager 106 determines whether the file stored in the distributed file system 102 has (or has not) been updated since the client 104a retrieved the unmodified version of file 306 at step 202, the pointer managers 106 employ a consensus protocol to determine whether to accept the modified first version of the file 306' as the current version of the file in the distributed file system 102 (212). In some implementations, the consensus protocol employs the Paxos algorithm. Other consensus algorithms are, of course, possible and can be used by the pointer managers 106.

If a majority of the pointer managers 106 determine that the modified first version of the file 306' is the most current version of the file (214), the distributed file system 102 stores the modified first version of the file 306' as the current version of the file (216). The distributed file system 102 stores the modified first version of the file 306' in the repositories 110. In some implementations, the modified first version of the file 306' is stored in more than one of the repositories 110 for redundancy purposes.

Figure 5:
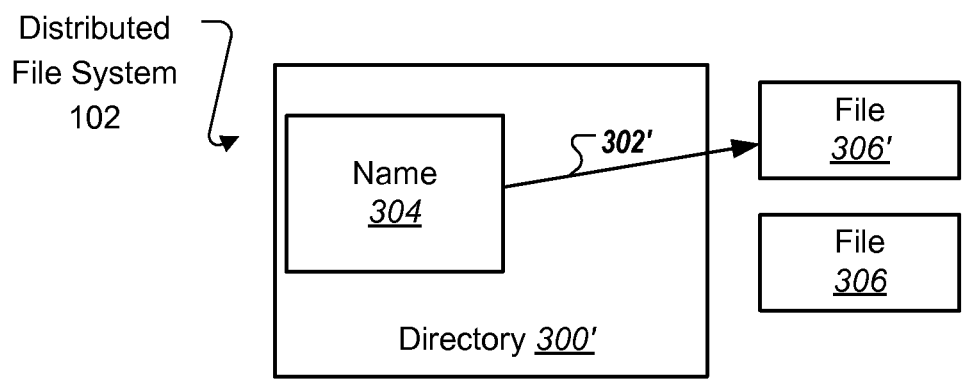
FIG. 5 is a schematic diagram of the example directory at the distributed file system, the distributed file system creating a new pointer and a modified version of the directory.

When making the modified first version of the file 306' the current version of the file, the distributed file system 102 creates a new pointer 302' and a modified version of the directory 300' (218), as shown in FIG. 5. The new pointer 302' references the modified file 306'. In some implementations, the distributed file system 102 returns the new pointer 302' and the modified version of the directory 300' to the client 104a. The client 104a stores the new pointers 302' and the modified version of the directory 300' in its local cache.

Figure 6:
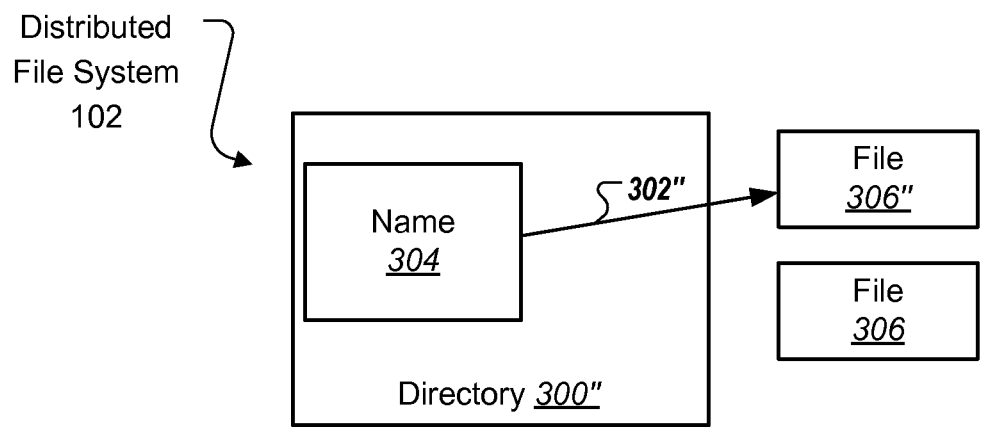
FIG. 6 is a schematic diagram of the example directory at the distributed file system, the distributed file system creating a further modified version of the directory including a modified second version of the file.

However, if a majority of the pointer managers 106 determine that the modified first version of the file 306' is not the most current version of the file (220), one or more of the pointer managers 106 transmit an error message to the client 104a indicating that the first modified version of the file 306' is not the most current version of the file (222). This can happen, for example, when the pointer managers 106 determine that the most current version of the file in the distributed file system 102 has been updated to a modified second version of the file (e.g. file 306"), as shown in FIG. 6, prior to client 104a attempting to make the modified first version of the file 306' the current version of the file in the distributed file system 102. In some implementations, in addition to or in lieu of transmitting the error message, the distributed file system 102 can suggest to combine the edited content of the two modified versions of the file 306 (i.e., file 306' and 306") into a further modified version of the file. In some implementations, the edited content of the two modified versions of the file 306 is mutually exclusive. In some implementations, in response to determining that the modified first version of the file 306' is not the most current version of the file, client 104a can obtain the most current version of the directory (e.g., directory 300") stored in the distributed file system 102 and identify the names 304 of one or more data objects stored in the current directory that are the same as the names 304 stored in the local cache 114 but that are associated with pointers that are different than the pointers associated with the names 304 stored in local cache 114. The clients 104a can then obtain, for each identified name 304, the file (e.g., file 306") referenced by the new pointer (e.g., pointer 302") from the distributed file system 102.

When the client 104a is successful in making the modified first version of the file 306' the most current version of the file stored in the distributed file system 102, the client 104a does not have to download all of the contents of the directory 300' and/or data objects (e.g., file 306') referenced by the pointers (e.g., pointer 302') of the directory 300' when the client 104a accesses the directory 300' and the data objects (e.g., file 306') referenced by the pointers (e.g., pointer 302') of the directory again at a later time. Specifically, the client 104a does not have to download the modified first version of the file 306' (i.e., the most current version of the data object) from the distributed file system 102 since file 306' is stored in its local cache 114.

Figure 7:
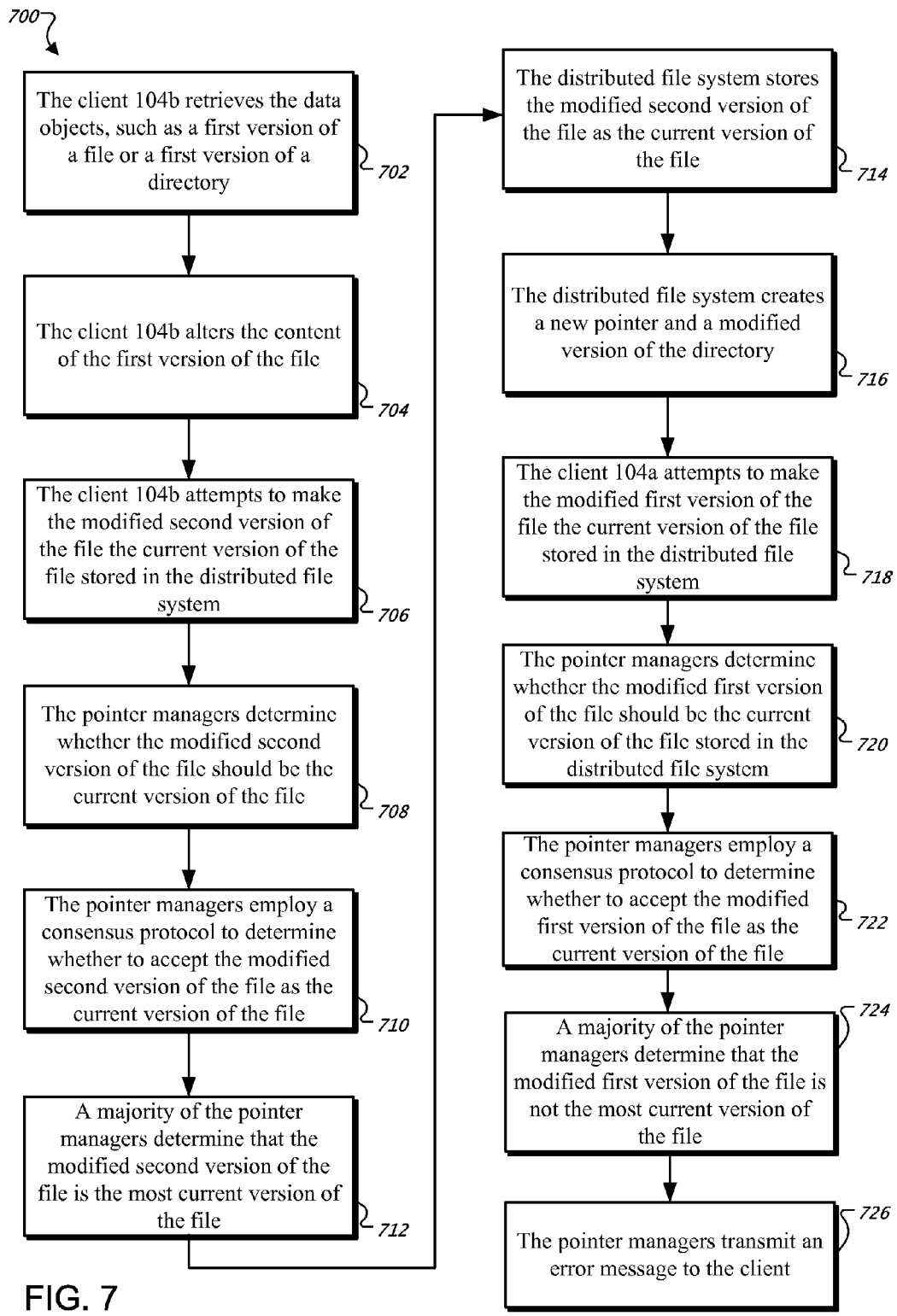
FIG. 7 is a flow diagram of an example technique for determining a most current version of a file when the client is unable to upload a modified first version of the file to the distributed file system.

In some implementations, the client 104a is unable to upload the modified first version of the file 306' to the distributed file system 102. Specifically, prior to the client 104a attempting to make the modified first version of the file 306' the current version of the file stored in the distributed file system 102 at step 208, the client 104b uploads a second modified version of the file 306 to the distributed file system 102. To that end, FIG. 7 is a flow diagram of an example technique 700 for determining a most current version of a file when the client 104a is unable to upload the modified first version of the file 306' to the distributed file system 102.

Figure 8:
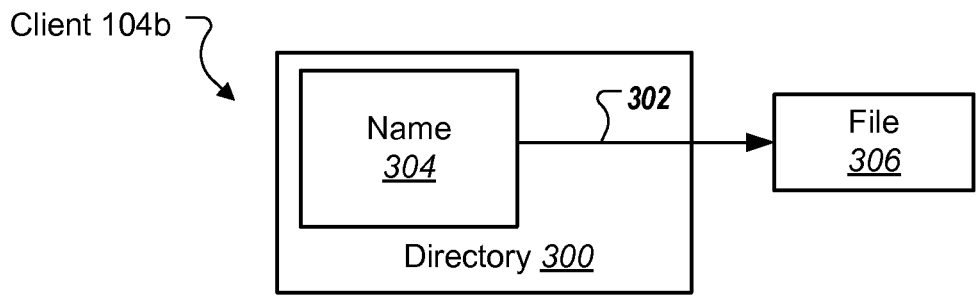
FIG. 8 is a schematic diagram of an example directory and a first version of a file at a second client.

Specifically, after the client 104a alters the content of the first version of the file 306 creating the modified first version of the file 306', as shown in FIG. 4, the client 104b can retrieve (e.g., download) the first version of the directory 300 and the first version of the file 306 (702), as shown in FIG. 8. The client 104b stores the first version of the directory 300 and the first version of the file 306 in its local cache 114.

Figure 9:
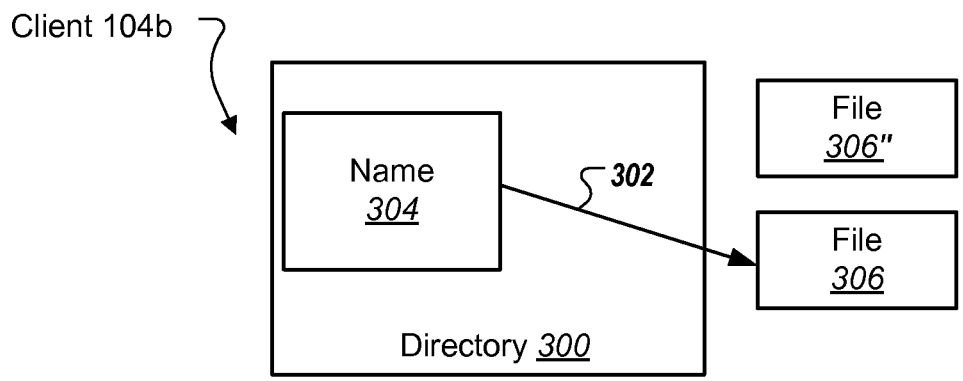
FIG. 9 is a schematic diagram of the example directory at the second client, the second client altering the contents of the first version of the file creating a modified second version of the file.

The client 104b alters the content of the first version of the file 306 creating a modified second version of the file 306" (704), as shown in FIG. 9. The client 104b attempts to make the modified second version of the file 306" the current version of the file stored in the distributed file system 102 (706). When it does, the pointer managers 106 determine whether the modified second version of the file 306" should be the current version of the file stored in the distributed file system 102 (708). To do this, each pointer manager 106 first determines whether the file stored in the distributed file system 102 has (or has not) been updated since the client 104b retrieved the unmodified version of file 306 at step 702. After each pointer manager 106 determines whether the file stored in the distributed file system 102 has (or has not) been updated since the client 104b retrieved the unmodified version of file 306 at step 702, the pointer managers 106 employ a consensus protocol to determine whether to accept the modified second version of the file 306" as the current version of the file in the distributed file system 102 (710). In some implementations, the consensus protocol employs the Paxos algorithm. Other consensus algorithms are, of course, possible and can be used by the pointer managers 106.

If a majority of the pointer managers 106 determine that the modified second version of the file 306" is the most current version of the file (712), the distributed file system 102 stores the modified second version of the file 306" as the current version of the file (714). The distributed file system 102 stores the modified second version of the file 306" in the repositories 110. In some implementations, the modified second version of the file 306' is stored in more than one of the repositories 110 for redundancy purposes.

Figure 10:
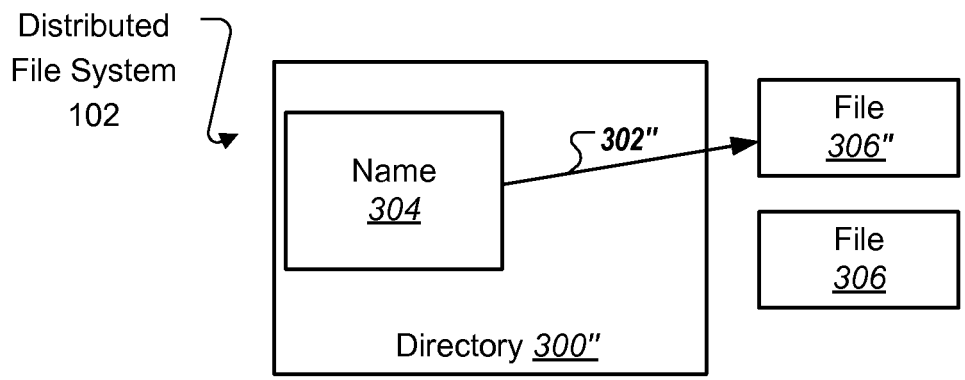
FIG. 10 is a schematic diagram of the example directory at the distributed file system, the distributed file system creating a new pointer and a modified version of the directory.

When making the modified second version of the file 306" the current version of the file, the distributed file system 102 creates a new pointer 302" and a modified version of the directory 300" (716), as shown in FIG. 10. The new pointer 302" references the modified second version of the file 306". In some implementations, the distributed file system 102 returns the new pointer 302" and the modified version of the directory 300" to the client 104b. The client 104b stores the new pointer 302" and the modified version of the directory 300" in its local cache.

After making the modified second version of the file 306" the current version of the file in the distributed file system, the client 104a attempts to make the modified first version of the file 306' the current version of the file stored in the distributed file system 102 (718). Specifically, the pointer managers 106 determine whether the modified first version of the file 306' should be the current version of the file stored in the distributed file system 102 (720). To do this, each pointer manager 106 first determines whether the file stored in the distributed file system 102 has (or has not) been updated since the client 104a retrieved the unmodified version of file 306. After each pointer manager 106 determines whether the file stored in the distributed file system 102 has (or has not) been updated since the client 104a retrieved the unmodified version of file 306, the pointer managers 106 employ a consensus protocol to determine whether to accept the modified first version of the file 306' as the current version of the file in the distributed file system 102 (722). In some implementations, the consensus protocol employs the Paxos algorithm. Other consensus algorithms are, of course, possible and can be used by the pointer managers 106.

If a majority of the pointer managers 106 determine that the modified first version of the file 306' is not the most current version of the file (724), one or more of the pointer managers 106 transmit an error message to the client 104a indicating that the first modified version of the file 306' is not the most current version of the file (726). Instead, the pointer managers 106 determine that the most current version of the file in the distributed file system 102 has been updated to the modified second version of the file (e.g. file 306") prior to the client 104a attempting to make the modified first version of the file 306' the current version of the file in the distributed file system 102.

Figure 11A:
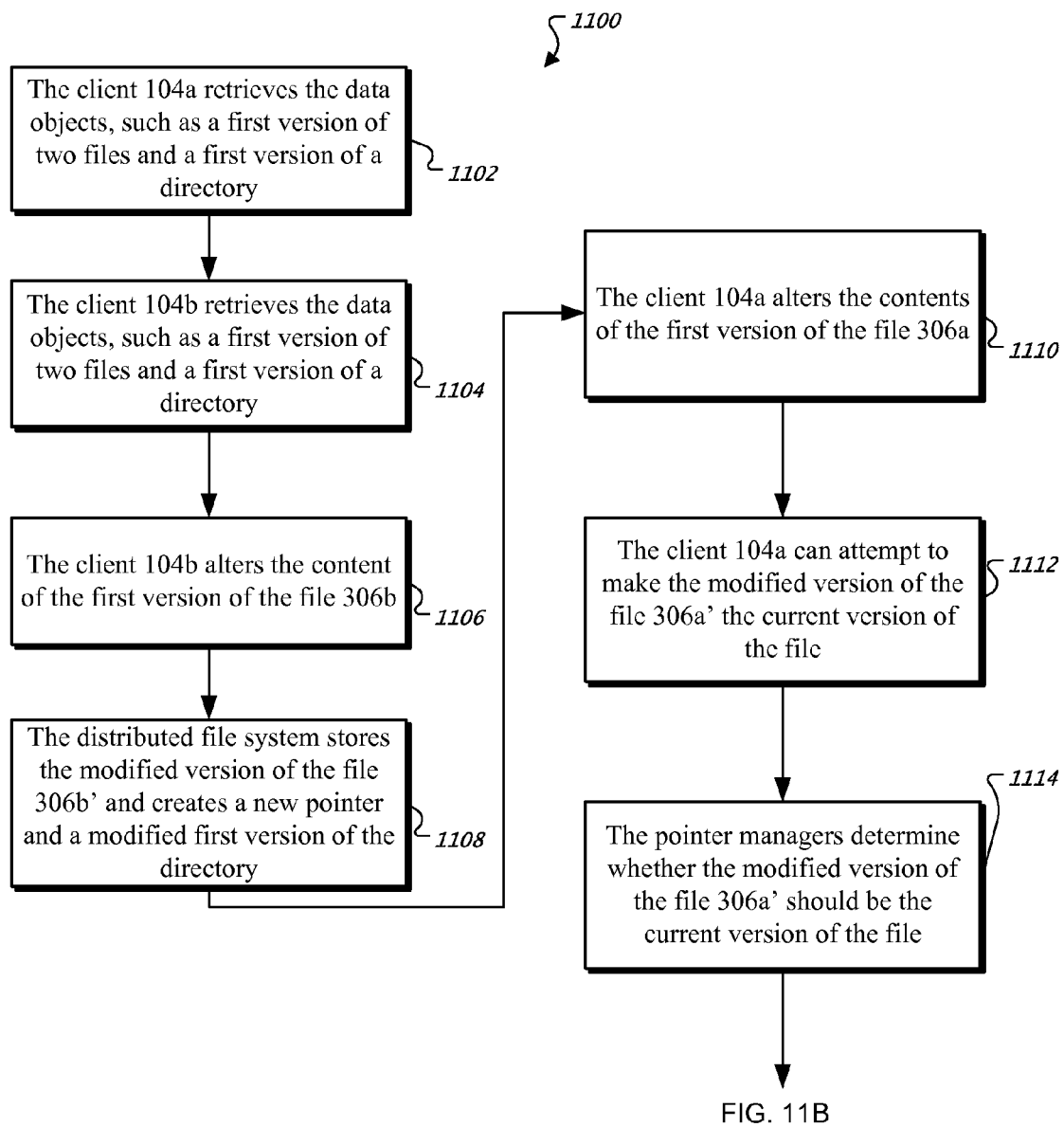
FIGS. 11A-C show a flow diagram of an example technique employed by the system for determining a most current version of a directory stored by the distributed file system.
Figure 11B:
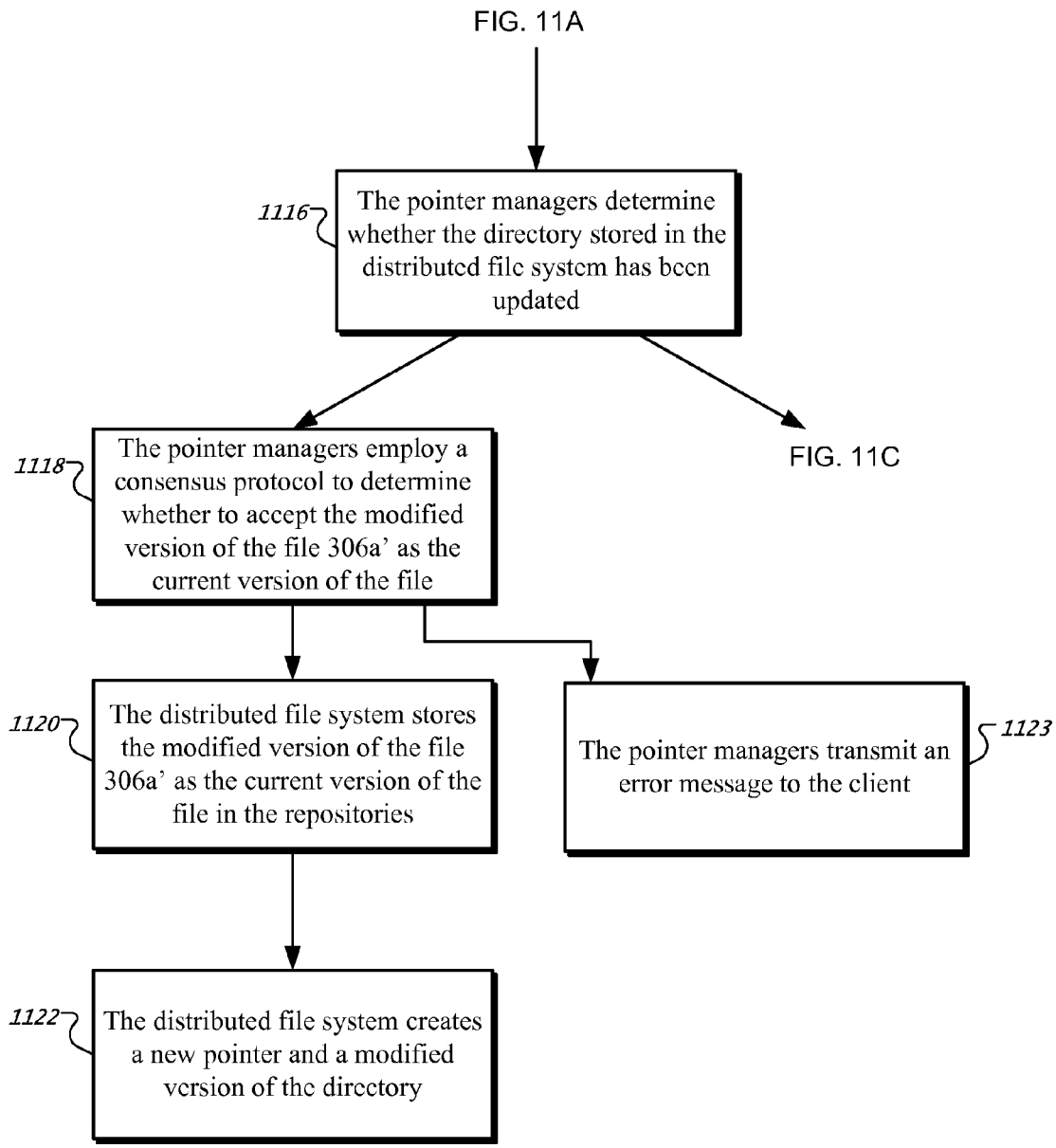
Figure 11C:
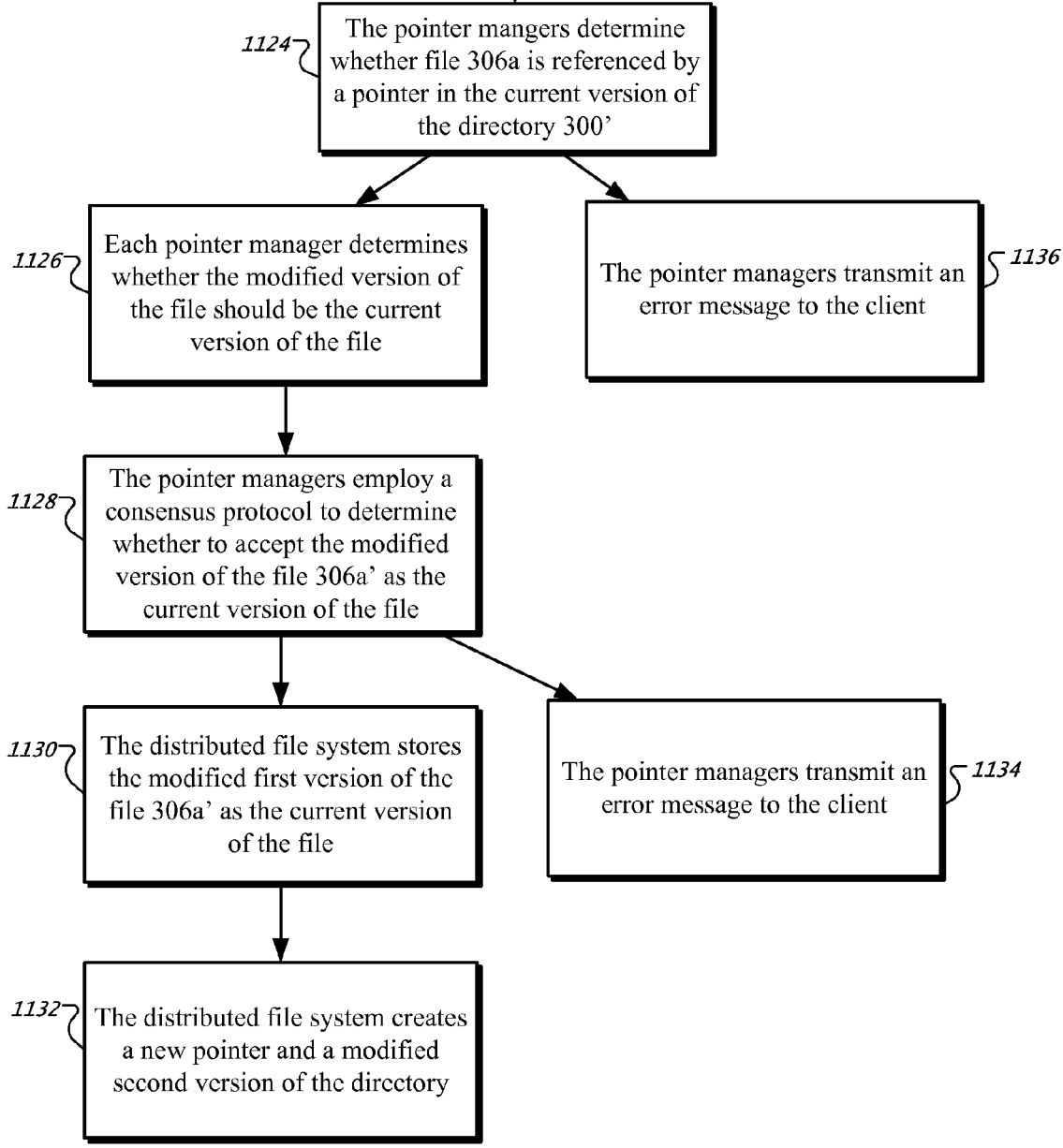

In some implementations, the directory can be modified prior to the client 104a attempting to upload the modified first version of the file 306' to the distributed file system 102. Specifically, prior to the client 104a attempting to make the modified version of the file 306' the current version of the file stored in the distributed file system 102, the client 104b alters the directory 300 stored in the distributed file system 102. To that end, FIGS. 11A-C show a flow diagram of an example technique 1100 employed by the system 100 for determining a most current version of a directory stored by the distributed file system 102.

Figure 12:
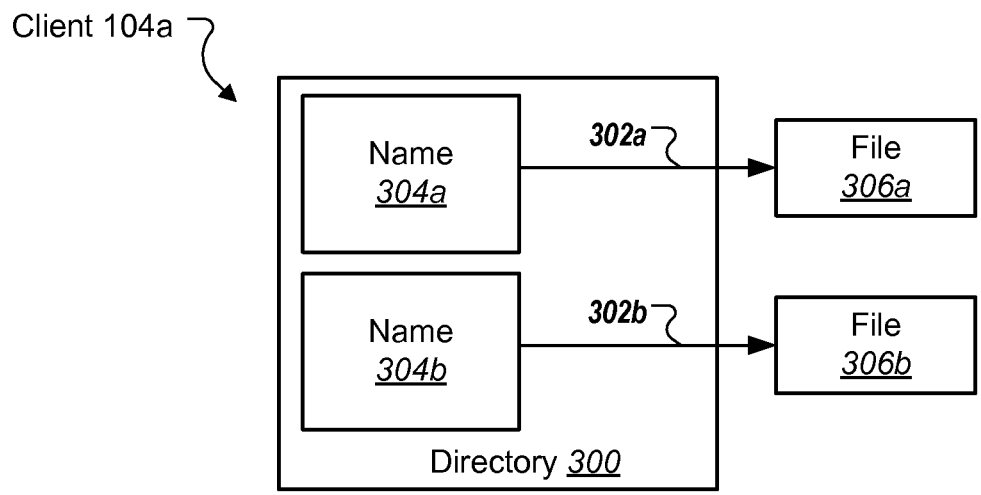
FIG. 12 is a schematic diagram of an example directory and a first version of a first and a second file at a first client.
Figure 13:
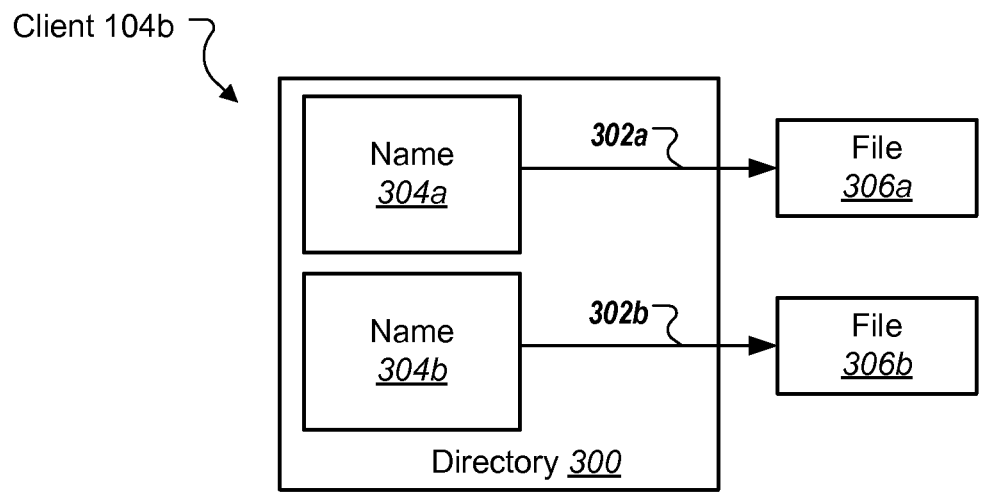
FIG. 13 is a schematic diagram of the example directory and the first version of the first and the second file at a second client.

The client 104a can retrieve (e.g., download) one or more data objects, such as a first version of a directory 300 and a first version of a file 306a and a first version of a file 306b (1102), as shown in FIG. 12. Similarly, the client 104b can retrieve the first version of the directory 300 and the first version of the file 306a and the first version of the file 306b (1104), as shown in FIG. 13.

Figure 14:
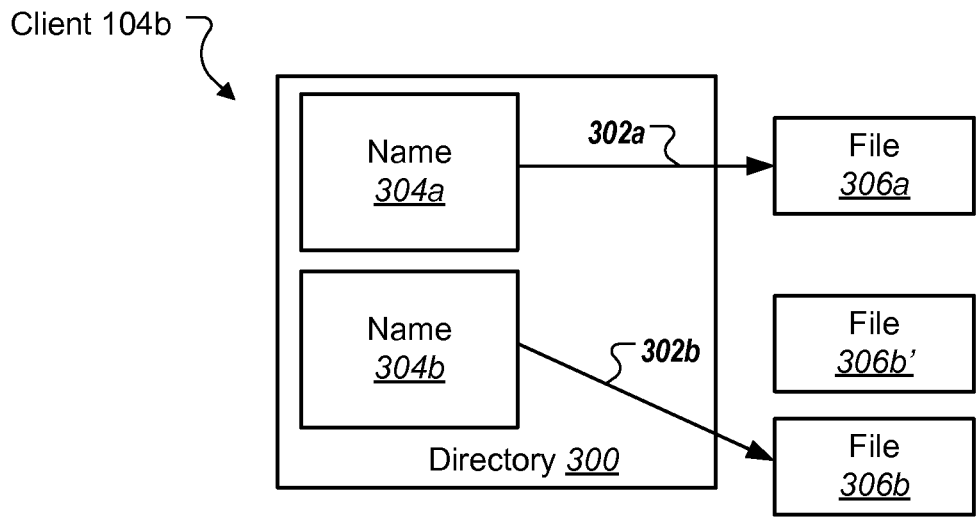
FIG. 14 is a schematic diagram of the example directory at the second client, the second client altering the contents of the first version of the second file creating a modified version of the second file.
Figure 15:
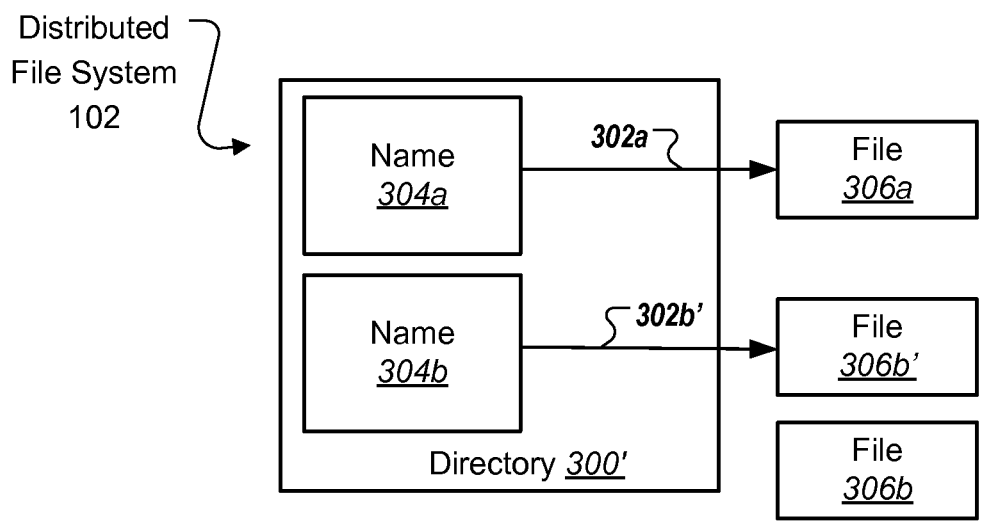
FIG. 15 is a schematic diagram of the example directory at the distributed file system, the distributed file system creating a new pointer and a modified first version of the directory.

The client 104b alters the content of the first version of the file 306b creating a modified version of the file 306b' (1106), as shown in FIG. 14. The client 104b is successful in making the modified version of the file 306b' the most current version of the file, and thus the distributed file system 102 creates a new pointer 302b' and a modified first version of the directory 300' (1108), as shown in FIG. 15. The new pointer 302b' references the modified version of the file 306b'.

Figure 16:
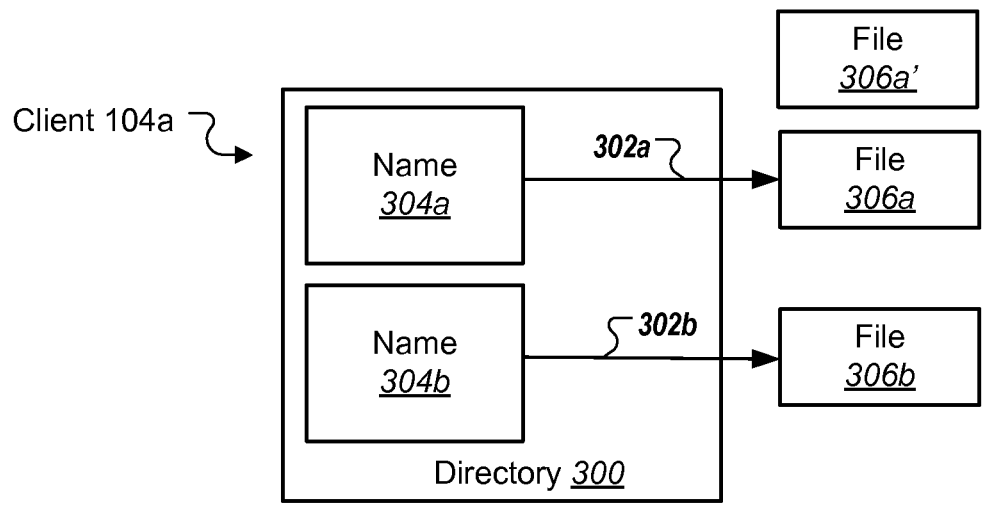
FIG. 16 is a schematic diagram of the example directory at the first client, the first client altering the contents of the first version of the first file creating a modified version of the first file.

The client 104a can alter the contents of the first version of the file 306a creating a modified version of the file 306a' (1110), as shown in FIG. 16. The client 104a can then attempt to make the modified version of the file 306a' the current version of the file in the distributed file system 102 (1112). When it does, the pointer managers 106 determine whether the modified version of the file 306a' should be the current version of the file stored in the distributed file system 102 (1114). To do this, each pointer manager 106 first determines whether the directory including the pointer referencing the file 306a stored in the distributed file system 102 has (or has not) been updated since the client 104a retrieved the unmodified version of the directory 300 at step 1102 (1116). If a majority of the pointer managers 106 determine that the directory 300 has not been updated since the client 104a retrieved the unmodified version of the directory 300, the pointer managers 106 employ a consensus protocol to determine whether to accept the modified version of the file 306a' as the current version of the file in the distributed file system 102 (1118). In some implementations, the consensus protocol employs the Paxos algorithm. Other consensus algorithms are, of course, possible and can be used by the pointer managers 106.

If a majority of the pointer managers 106 determine that the modified version of the file 306a' is the most current version of the file, the distributed file system 102 stores the modified version of the file 306a' as the current version of the file (1120) and creates a new pointer and modified version of the directory (1122). The new pointer 302' references the modified file 306' in the modified version of the directory 300'. If a majority of the pointer managers 106 determine that the modified version of the file 306a' is not the most current version of the file, one or more of the pointer managers 106 transmit an error message to the client 104a indicating that the modified version of the file 306a' is not the most current version of the file (1123).

If a majority of the pointer managers 106 determine that the directory 300 has been updated since the client 104a retrieved the unmodified version of the directory 300 (e.g., updated to directory 300' at step 1108), the pointer mangers 106 determine whether file 306a is referenced by a pointer in the current version of the directory 300' (1124). For example, whether a pointer is included in the current version of the directory 300' that references the file 306a. If the majority of the pointer managers 106 determine that the file 306a is referenced by a pointer in the current version of the directory 300', the pointer managers 106 determine whether the modified version of the file 306a' should be accepted as the current version of the file stored in the distributed file system 102 (1126). To do this, each pointer manager 106 first determines whether the file stored in the distributed file system 102 has (or has not) been updated since the client 104a retrieved the unmodified version of file 306a at step 1102. After each pointer manager 106 determines whether the file stored in the distributed file system 102 has (or has not) been updated since the client 104a retrieved the unmodified version of file 306a, the pointer managers 106 employ a consensus protocol to determine whether to accept the modified version of the file 306a' as the current version of the file in the distributed file system 102 (1128).

Figure 17:
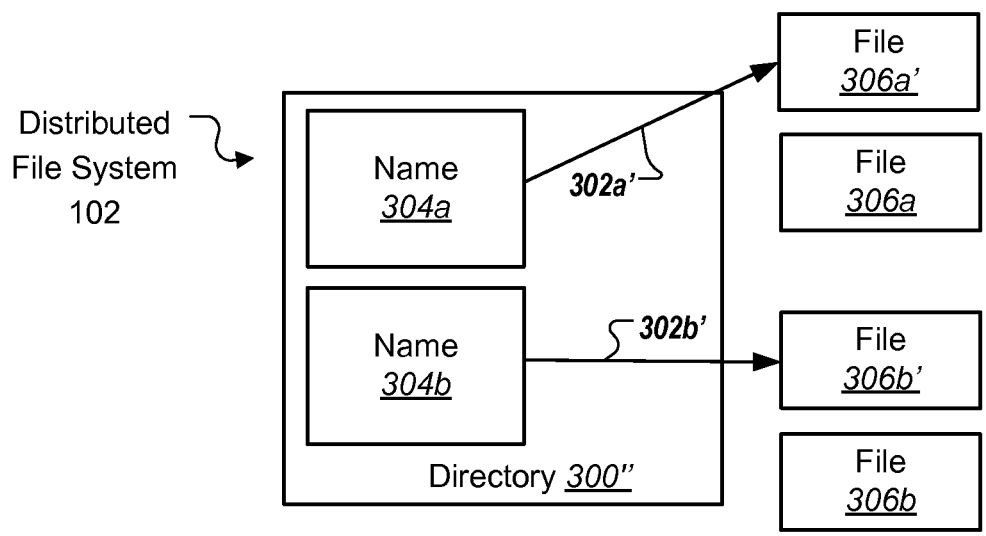
FIG. 17 is a schematic diagram of the example directory at the distributed file system, the distributed file system creating a new pointer and a modified second version of the directory.

If a majority of the pointer managers 106 determine that the modified first version of the file 306a' is the most current version of the file, the distributed file system 102 stores the modified first version of the file 306a' as the current version of the file (1130). The distributed file system 102 stores the modified version of the file 306a' in the repositories 110. When making the modified version of the file 306a' the current version of the file, the distributed file system 102 creates a new pointer 302a' and a modified second version of the directory 300" (1132), as shown in FIG. 17. The new pointer 302a' references the modified file 306a' in the modified second version of the directory 300". In some implementations, the distributed file system 102 returns the new pointer 302a' and the modified second version of the directory 300" to the client 104a. The client 104a stores the new pointers 302a' and the modified second version of the directory 300" in its local cache 114.

If a majority of the pointer managers 106 determine that the modified version of the file 306a' is not the most current version of the file, one or more of the pointer managers 106 transmit an error message to the client 104a indicating that the modified version of the file 306a' is not the most current version of the file (1134). Instead, the pointer managers 106 determine that the most current version of the file in the distributed file system 102 has been updated prior to the client 104a attempting to make the modified version of the file 306a' the current version of the file in the distributed file system 102.

If the majority of the pointer managers 106 determine that the file 306a is not referenced by a pointer in the current version of the directory 300' at step 1124, one or more of the pointer managers 106 transmit an error message to the client 104a indicating that file 306 is not presently include in directory 300 (1136).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method including:
    identifying, by a first pointer manager of a plurality of pointer managers, a first version of a directory, the first version of the directory including i) a first pointer and ii) an association of a name with the first pointer, wherein the first pointer is a reference to a first version of an immutable data object in an append-only file system;
    receiving, by the first pointer manager, a modified version of the data object from a first computing device in communication with the first pointer manager;
    determining, by each pointer manager of the plurality of pointer managers, whether the data object stored by the file system was updated by any computing device other than the first computing device before the first pointer manager received the modified version of the data object;
    if a majority of the plurality of pointer managers determine that the data object stored by the file system was not updated by any computing device other than the first computing device before the first pointer manager received the modified version of the data object:
        creating a second pointer that is a reference to the modified version of the data object, associating the name with the second pointer, and disassociating the name from the first pointer, and
        creating a modified version of the directory, the modified version of the directory including i) the second pointer and ii) an association of the name with the second pointer;
    if a majority of the plurality of pointer managers determine that the data object stored by the file system was updated by any computing device other than the first computing device before the first pointer manager received the modified version of the data object:
        providing, to the first computing device, a current version of the directory stored by the filed system including i) a third pointer to a most current version of the data object and ii) an association of the name with the third pointer.

2. The method of claim 1, wherein the determining further comprises determining whether the data object stored by the file system was updated by any computing device other than the first computing device before the first pointer manager received the modified version of the data object using a consensus protocol.

3. The method of claim 2, wherein the consensus protocol uses the Paxos algorithm.

4. The method of claim 1, wherein the immutable data object is a file or a directory.

5. The method of claim 1, wherein the first or the second pointer represents a hash digest of the data object referred to by the first or the second pointer.

6. The method of claim 5, wherein the hash digest is generated using a SHA-1 hash function.

7. The method of claim 1, wherein the append-only file system does not allow data objects stored in the append-only file system to be modified.

8. The method of claim 1, wherein the append-only file system is distributed across different storage nodes.

9. A system comprising:
    a computer readable medium having instructions stored thereon; and
    data processing apparatus configured to execute the instructions to perform operations comprising:
        identifying, by a first pointer manager of a plurality of pointer managers, a first version of a directory, the first version of the directory including i) a first pointer and ii) an association of a name with the first pointer, wherein the first pointer is a reference to a first version of an immutable data object in an append-only file system;
        receiving, by the first pointer manager, a modified version of the data object from a first computing device in communication with the first pointer manager;
        determining, by each pointer manager of the plurality of pointer managers, whether the data object stored by the file system was updated by any computing device other than the first computing device before the first pointer manager received the modified version of the data object;
        if a majority of the plurality of pointer managers determine that the data object stored by the file system was not updated by any computing device other than the first computing device before the first pointer manager received the modified version of the data object:
            creating a second pointer that is a reference to the modified version of the data object, associating the name with the second pointer, and disassociating the name from the first pointer, and
            creating a modified version of the directory, the modified version of the directory including i) the second pointer and ii) an association of the name with the second pointer;
        if a majority of the plurality of pointer managers determine that the data object stored by the file system was updated by any computing device other than the first computing device before the first pointer manager received the modified version of the data object:
            providing, to the first computing device, a current version of the directory stored by the filed system including i) a third pointer to a most current version of the data object and ii) an association of the name with the third pointer.

10. The system of claim 9, wherein the determining further comprises determining whether the data object stored by the file system was updated by any computing device other than the first computing device before the first pointer manager received the modified version of the data object using a consensus protocol.

11. The system of claim 10, wherein the consensus protocol uses the Paxos algorithm.

12. The system of claim 9, wherein the immutable data object is a file or a directory.

13. The system of claim 9, wherein the first or the second pointer represents a hash digest of the data object referred to by the first or the second pointer.

14. The system of claim 13, wherein the hash digest is generated using a SHA-1 hash function.

15. The system of claim 9, wherein the append-only file system does not allow data objects stored in the append-only file system to be modified.

16. The system of claim 9, wherein the append-only file system is distributed across different storage nodes.

17. A storage media having instructions stored thereon that, when executed by data processing apparatus, cause the data processing apparatus to perform operations comprising:
- identifying, by a first pointer manager of a plurality of pointer managers, a first version of a directory, the first version of the directory including i) a first pointer and ii) an association of a name with the first pointer, wherein the first pointer is a reference to a first version of an immutable data object in an append-only file system;
- receiving, by the first pointer manager, a modified version of the data object from a first computing device in communication with the first pointer manager;
- determining, by each pointer manager of the plurality of pointer managers, whether the data object stored by the file system was updated by any computing device other than the first computing device before the first pointer manager received the modified version of the data object;
- if a majority of the plurality of pointer managers determine that the data object stored by the file system was not updated by any computing device other than the first computing device before the first pointer manager received the modified version of the data object:
  - creating a second pointer that is a reference to the modified version of the data object, associating the name with the second pointer, and disassociating the name from the first pointer, and
  - creating a modified version of the directory, the modified version of the directory including i) the second pointer and ii) an association of the name with the second pointer;
- if a majority of the plurality of pointer managers determine that the data object stored by the file system was updated by any computing device other than the first computing device before the first pointer manager received the modified version of the data object:
  - providing, to the first computing device, a current version of the directory stored by the filed system including i) a third pointer to a most current version of the data object and ii) an association of the name with the third pointer.

18. The storage media of claim 17, wherein the determining further comprises determining whether the data object stored by the file system was updated by any computing device other than the first computing device before the first pointer manager received the modified version of the data object using a consensus protocol.

19. The storage media of claim 18, wherein the consensus protocol uses the Paxos algorithm.

20. The storage media of claim 17, wherein the immutable data object is a file or a directory.

21. The storage media of claim 17, wherein the first or the second pointer represents a hash digest of the data object referred to by the first or the second pointer.

22. The storage media of claim 21, wherein the hash digest is generated using a SHA-1 hash function.

23. The storage media of claim 17, wherein the append-only file system does not allow data objects stored in the append-only file system to be modified.

24. The storage media of claim 17, wherein the append-only file system is distributed across different storage nodes.

* * * * *